July 29, 1941.  A. J. RUEGG ET AL  2,250,815
MIXING VALVE
Filed Jan. 27, 1938  4 Sheets-Sheet 1
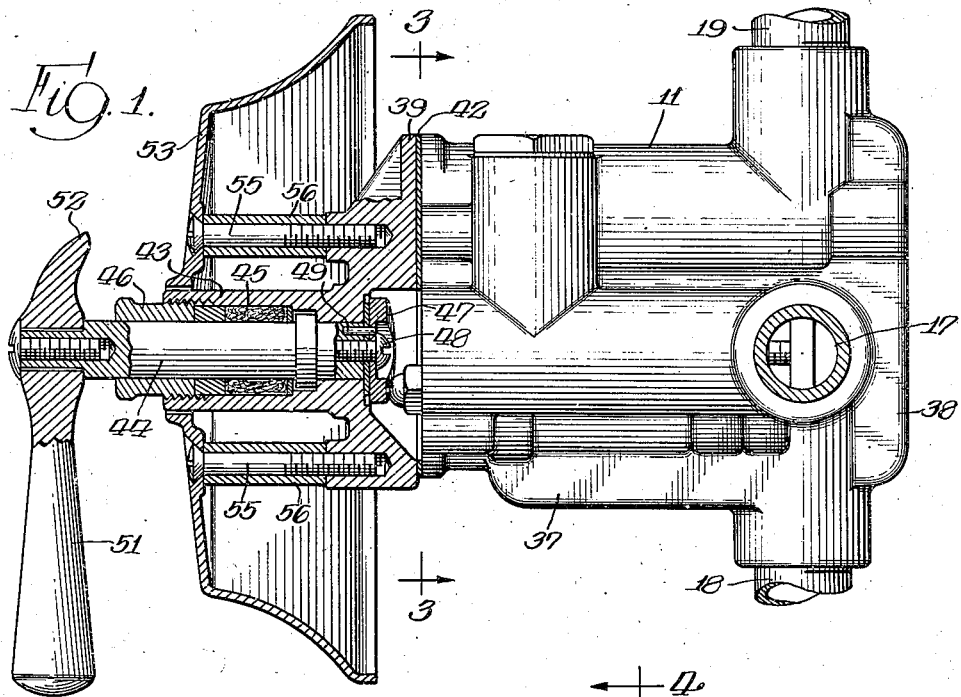
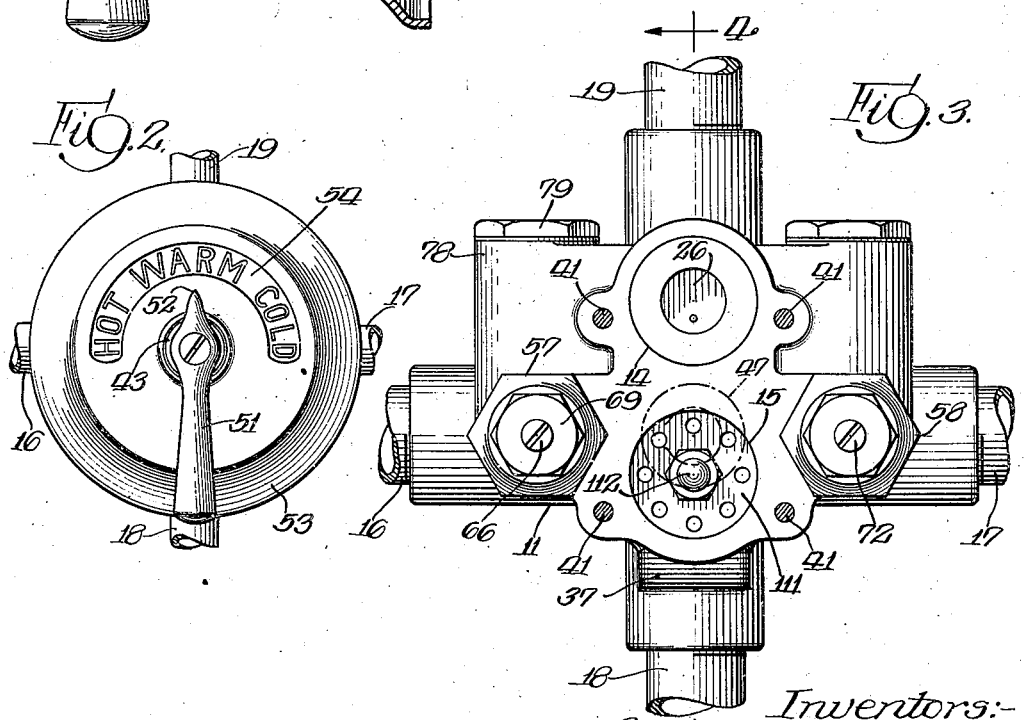
Inventors:—
Albert J. Ruegg,
Glen Martin,
By Ira J. Wilson Atty.

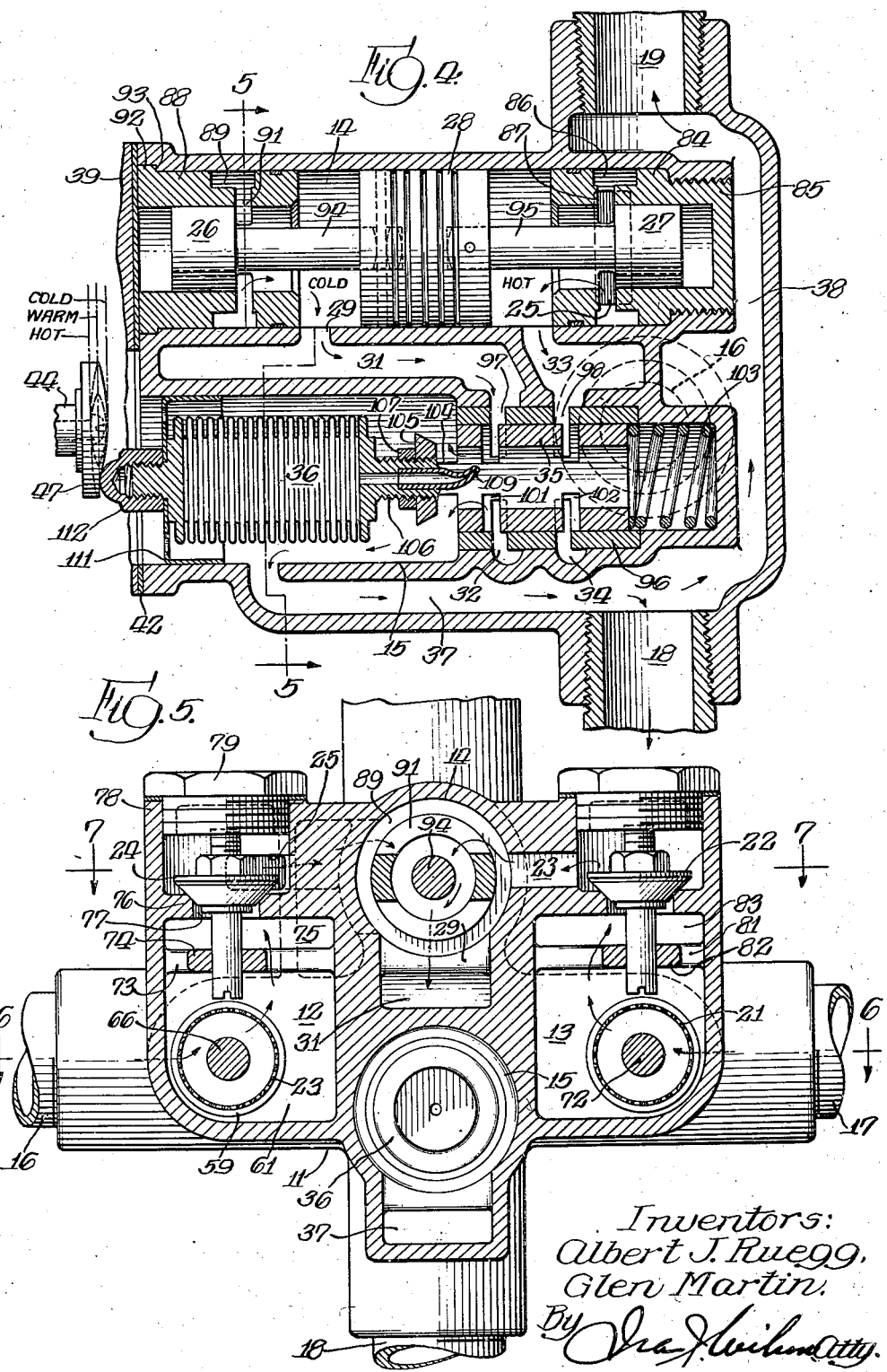

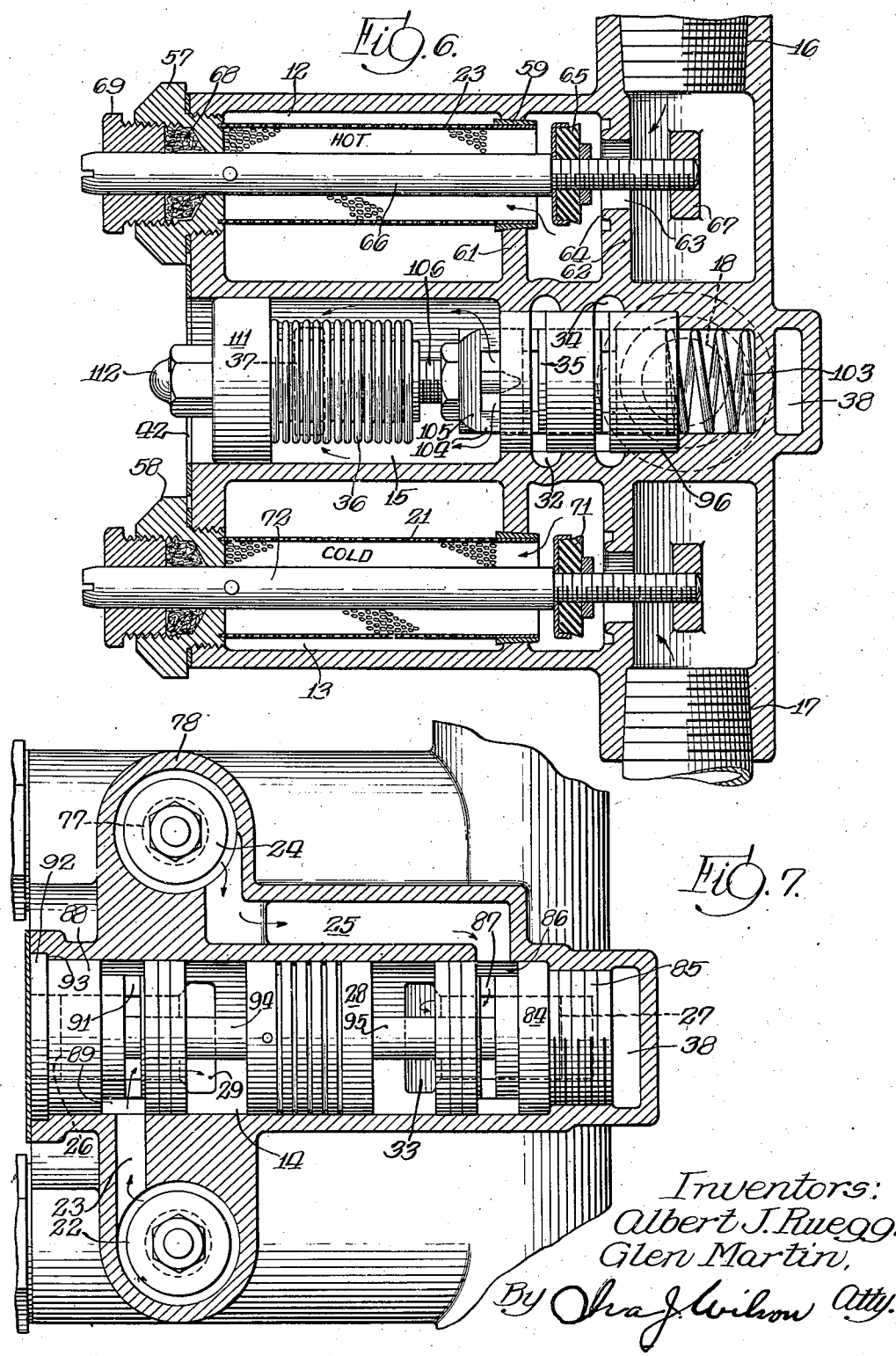

July 29, 1941.  A. J. RUEGG ET AL  2,250,815
MIXING VALVE
Filed Jan. 27, 1938  4 Sheets-Sheet 4
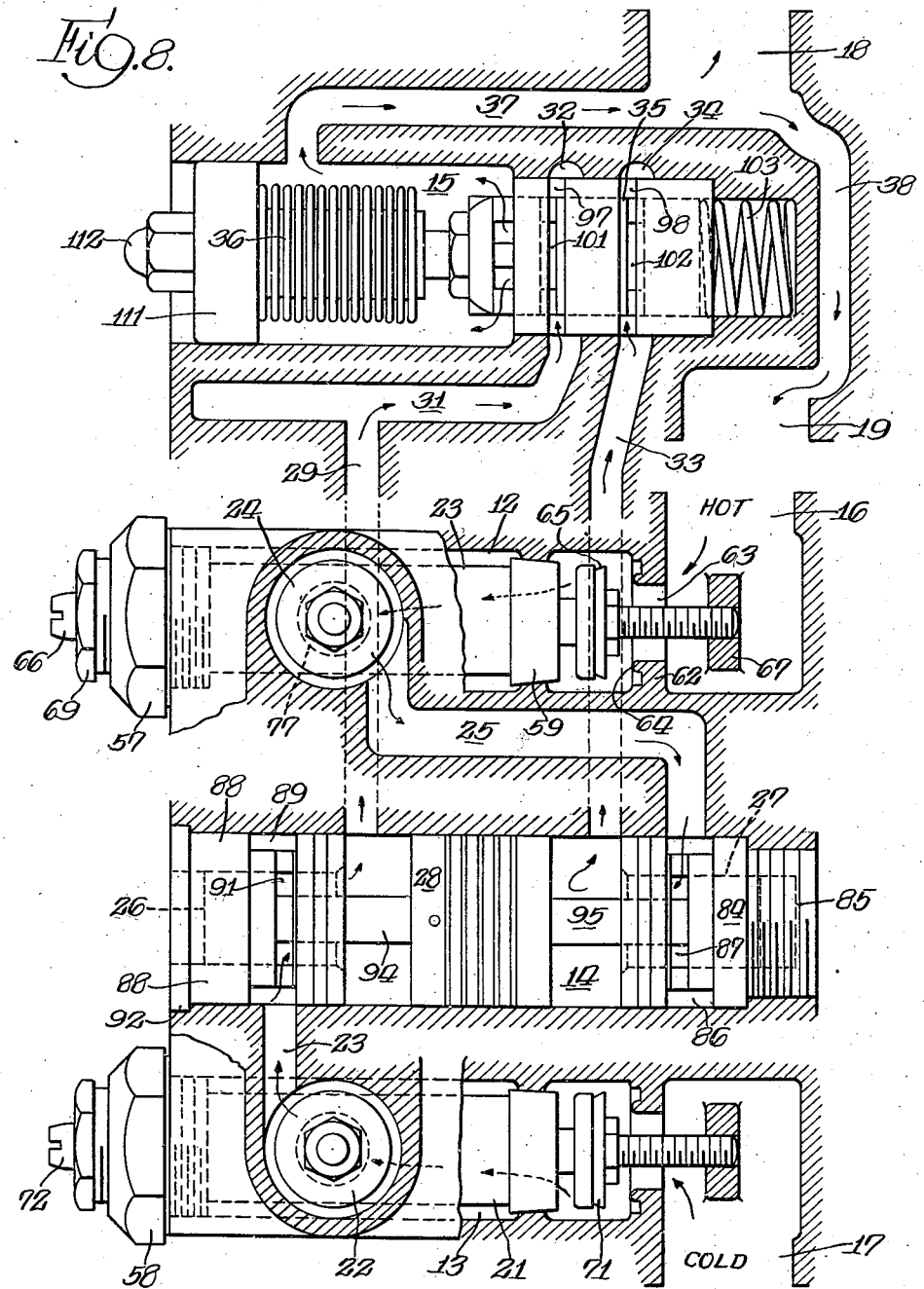
Inventors:
Albert J. Ruegg,
Glen Martin,
By Ira J. Wilm Atty.

Patented July 29, 1941

2,250,815

UNITED STATES PATENT OFFICE 2,250,815

MIXING VALVE

Albert J. Ruegg and Glen Martin, Lynwood, Calif., assignors to Grayson Heat Control, Ltd., Lynwood, Calif., a corporation of California Application January 27, 1938, Serial No. 187,120

7 Claims. (Cl. 236—12)

This invention pertains to mixing valves for mixing hot and cold liquids to produce and deliver a liquid mixture of a predetermined temperature.

While the principles of our invention may be utilized in valves designed for various purposes and locations, the one here illustrated as exemplifying our invention is designed for household use to furnish water of a predetermined desired temperature for bath, shower, and other purposes.

Thermostatically-controlled mixing valves are quite common in the art, but the tempered water delivered by such valves has heretofore varied in temperature in accordance with variations in the pressures of the hot and cold water delivered to the valve. For instance, if such a valve were set to deliver water at a temperature of 120°, the opening of a faucet in the hot water line so as to decrease the pressure would result in a preponderance of cold water delivered to the valve, thereby causing temporarily at least a sharp reduction in temperature of the resultant mixture. Likewise, a decrease in pressure in the cold water line would result in a sharp rise in temperature of the mixture delivered from the mixing valve. Consequently, as was previously stated, the temperature of the resultant mixture delivered by such valves has been subject to variations occasioned by differences in the pressures of the hot and cold water supply to the valve.

One of the purposes of our present invention is to overcome the temperature fluctuations of the resultant mixture occasioned by pressure variations in the supply lines. In our invention we have accomplished this result by incorporating in the valve structure a pressure-controlled valve arrangement which balances the pressures of the incoming liquids. so that the quantity delivered into the mixing chamber of the valve will vary inversely with the pressure, thereby maintaining a uniform temperature of the delivered mixture and obviating those undesirable temperature fluctuations which have been caused by pressure variations in the supply lines.

Another advantageous feature of our invention resides in the construction which entirely shuts off the hot or the cold water flow, as the case may be, in the event that the cold or the hot water supply line to the valve should be cut off. This feature obviates the possibility of the delivery of scalding water to a person taking a shower or tub bath in the event that the cold water supply should for some reason be entirely cut off.

Another feature of our invention, which also involves a safety factor in that it precludes scalding of the user of the water delivered by the mixing valve, resides in the feature which entirely shuts off the hot water supply in the event of breakage of the thermostatic control or of the inoperativeness of the same for any reason whatsoever.

Another object of our invention is to provide a mixing valve which will be accurate and reliable so as to insure the delivery of water at the predetermined temperature for which the valve is set and with a minimum of variation from the selected temperature. Our invention further contemplates a valve construction in which all of the parts are accessible from and removable through the front of the valve so that any necessary repairs or replacement of parts can be accomplished from the front of the structure, thereby obviating disconnection from the water lines in or behind the wall and obviating all labor in the rear of the wall in which the valve is mounted.

Another feature of our invention resides in the provision of means whereby both the hot and the cold water supply lines to the valve may be quickly shut off from the front of the valve, the construction being such that when so shut off the top of the valve casing may be removed to permit access to any parts requiring attention. In other words, the shut-off devices are accessible and readily operable and are not dependent upon the other working parts of the valve, consequently, when they are employed to shut off the water all the other parts of the valve remain accessible for repair, adjustment or replacement purposes.

Another advantageous feature of our invention resides in the mixing chamber in which the hot and cold water are mixed before coming in contact with the thermostatic element. This feature relieves this element from the strains to which such elements have heretofore been subjected by reason of the fact that the hot and cold water were delivered directly against the element in the mixing chamber. The sudden and wide temperature variations resulting from the discharge of both hot and cold water directly against the thermostatic element materially have produced strains in the elements which impaired their durability and effective life.

Another purpose of our invention is to provide a valve which can be readily adjusted so as to deliver a mixture of any desired temperature, the construction of the valve being such that the adjustments may be easily accomplished with a minimum of labor.

Other objects and many of the inherent advantages of our invention should be readily appreciated as the same becomes better understood by reference to the following description when considered in connection with the accompanying drawings.

Referring to the drawings:

Fig. 1 is a plan view partially in section of a mixing valve constructed in accordance with our invention;

Fig. 2 is an end elevation looking toward the right at Fig. 1;

Fig. 3 is a plan view of the valve casing with the cap removed, this view being taken on the line 3—3 of Fig. 1;

Fig. 4 is a transverse sectional view on the line 4—4 of Fig. 3;

Fig. 5 is a sectional view on the line 5—5 of Fig. 4;

Fig. 6 is a sectional view on the line 6—6 of Fig. 5;

Fig. 7 is a sectional view on the line 7—7 of Fig. 5; and

Fig. 8 is a diagrammatic semi-developed view illustrating the paths of travel of the liquids through the valve.

Referring to the drawings more in detail, the valve comprises essentially a casing designated generally as 11 which is shaped to provide, generally speaking, four longitudinally extending bores or cylindrical chambers which may be identified as the inlet chambers 12 and 13 respectively, the pressure balancing chamber 14 and the thermostatic control chamber 15. The inlet chamber 12 is normally in communication with a hot water supply connection 16, and the inlet chamber 13 is normally in communication with a cold water supply connection 17. The tempered mixture may be delivered from the casing through either or both of two discharge connections 18 and 19, one of which will in a standard installation be connected with a tub faucet and the other with a showerhead.

To facilitate an early understanding of the principles and the general mode of operation of a valve constructed in accordance with our invention, reference will first be had to the schematic layout of Fig. 8, and the structural details will be later more fully explained from the remaining figures of the drawings in which they are more clearly illustrated.

Referring now to Fig. 8, the cold water enters the casing through the connection 17, flows laterally into the longitudinally disposed inlet chamber 13, past a shut-off valve to be later described, and enters this chamber from the interior of a cylindrical screen 21 through which it passes outwardly into the chamber 13. From this chamber it flows past a check valve 22 through a passage 23 into the pressure-equalizing chamber 14.

The hot water enters the casing through the connection 16 from which it passes to the chamber 12 through a cylindrical screen 23 identical with screen 21, thence past a check valve 24, and through a passage 25 into the pressure balancing chamber 14 near the opposite end thereof.

The flow of hot and cold water into this chamber 14 is regulated by a pair of valves 27 and 26, respectively, controlling the inlet ports leading from the passages 23 and 25, the valves being connected to a centrally disposed piston 28, the position of which longitudinally of the chamber 14 will be determined by the pressures of the hot and cold water upon the opposite ends of the piston. If, for instance, the pressure of the cold water exceeds that of the hot water, the piston will move to the right viewing Fig. 4, thereby through valve 26 reducing the inflow of cold water into the chamber. Such reduction in flow will, of course, produce a corresponding pressure reduction on that side of the piston with the result that the piston will at all times assume a balanced position determined by the relative pressures on its opposite faces. The balancing chamber therefore insures that the relative flows of hot and cold water will be in inverse ratio to the pressures of these two sources of water. This arrangement obviates the possibility of the delivery of scalding hot water as the result of failure of the cold water supply and also eliminates the temperature fluctuations of lesser degree which customarily occur as the result of pressure variations in the line occasioned by the opening of a faucet or faucets in either the hot or cold water supply line.

From the pressure-equalizing chamber 14, the cold water flows through a passage 29 into a passage 31 by which it is conducted to the inlet port 32 opening into the chamber 15. Similarly, the hot water from the pressure-equalizing chamber 14 flows through a passage 33 to the inlet port 34 also in communication with the chamber 15.

The relative proportions of hot and cold water delivered from ports 34 and 32 into the mixing chamber at one end of chamber 15 is regulated by a slide valve indicated generally by reference character 35 controlling both of these ports and in turn controlled by a thermostatic element 36 in the chamber 15. By means of this thermostatic element, the temperature of the mixture produced by the confluence of the hot and cold water is regulated and controlled so that the temperature of the mixture delivered from chamber 15 through passage 37 will remain substantially uniform irrespective of variations in either temperature or pressure of the supplies of hot and cold water. From passage 37 the mixture is delivered from the casing through discharge connection 18 and alternately or simultaneously through discharge connection 19 which is reached through the transverse passage 38.

It should be manifest, therefore, that irrespective of the details of the mechanism employed for accomplishing the result, our invention contemplates a mixing valve which will deliver a mixture at a uniform temperature irrespective of variations in the pressure or temperature of either the hot or the cold water from which the mixture is produced. The regulating mechanism by which the valve may be set or adjusted to deliver a mixture of a higher or a lower temperature as well as the details of the mechanisms by which other advantageous accomplishments of our invention are obtained will be best understood from the remaining figures of the drawings in which these features are shown. Referring first to Figs. 1 to 3 inclusive, it will be observed that the four parallel chambers 12, 13, 14 and 15, heretofore referred to, all open at the front end or viewing Fig. 1, the left hand end of the casing. This is the end of the casing which is exposed outside the wall in which the casing is customarily mounted, and since all of the operating parts of the valve proper are located in these chambers, access to all of them for removal, repairs, and replacement may be had from the front end of the casing.

The forward ends of pressure-equalizing chamber 14 and thermostatic chamber 15 are closed by a pedestal cap 39 which is secured to the end of the casing by stud bolts 41, leakage being prevented by an interposed gasket 42. The pedestal cap is formed to provide a central, outwardly projecting, elongated hollow boss 43, in which is rotatably mounted the stem 44 of the temperature regulating device. Leakage along the stem is prevented by packing 45 around the stem which is compressed by a gland 46 threaded in the usual manner into the boss 43. The inner end of the stem is provided with a face cam 47 secured to the stem by a screw 48 and held against rotation relatively to the stem by a pin 49.

The cam is adjusted to a position to produce a mixture of the desired temperature by means of a handle 51 provided with a pointer or finger 52 overlying a cover 53 upon the outer face of which appears suitable indicia 54 to guide the user in his manipulation of the handle. This cap, the open end of which is adapted to rest against the face of the wall in which the valve is located, conceals the valve structure from view and lends a finished and attractive appearance to the device. Elongated screws 55 extending through hollow posts 56 and threaded into the cap 39 removably hold the cover 53 in position.

The forward ends of chambers 12 and 13 are closed, as will be apparent from Figs. 3 and 6, by hollow plugs 57 and 58, respectively. The plug 57 carries the screen 23 which is equipped at its inner end with a tapered sleeve 59 adapted to snugly sit in a similarly shaped opening formed in a partition wall 61 extending transversely of chamber 12. The partition wall 62 separating the chamber 12 from the inlet passage 16 is provided with an inlet opening 63 surrounded by a valve seat 64 against which a valve 65 mounted upon a stem 66 is adapted to close. This stem is threadedly engaged at its lower end with a tapped opening in a transverse web 67 located in the inlet passage and at its outer end projects through the plug 57 into position to be rotated by a screw driver or the like from outside the forward end of the casing. Leakage along stem 66 through the plug 57 is prevented by a stuffing box of usual structure comprising the packing 68 and the gland 69.

The purpose of valve 65 is to enable the hot water to be shut off when necessary for repairs or replacements right at the valve itself and in front of the wall in which the valve is mounted, thereby obviating the necessity of shutting off the water in the basement, as is customary, and also the necessity of any manipulation back of the wall in which the valve is mounted, which is necessary in connection with most mixing valves.

Cold water chamber 13 closed by plug 58 carrying the screen 21 communicates with the cold water inlet 17 through an opening controlled by a valve 71 mounted on a stem 72, this structure being similar in all structural and functional respects with the construction just described in connection with chamber 12.

The hot water which enters the chamber 12 through the screen 23 from the hot water connection 16 flows upwardly from this chamber through a port 73 in wall 74 into a passage 75, the outer wall 76 of which has a port 77 adapted to be closed by check valve 24. This valve is located in a hollow boss 78 formed on the casing and closed at its outer end by a closure plug or nut 79, removal of which affords access to the valve 22 when occasion requires. From boss 78, the hot water flows through passage 25 into pressure-equalizing chamber 14 near the inner end thereof.

The cold water entering chamber 13 from the cold water connection 17 through screen 21 passes likewise through port 81 in wall 82 to passage 83, thence past check valve 22, through passage 23 into pressure-equalizing chamber 14 near the outer end thereof.

In the inner end of chamber 14 there is mounted a valve seat member designated generally 84 having a threaded cylindrical extremity 85 and a peripheral groove 86 communicating with passage 25 and provided with inwardly opening radial ports 87 through which water from passage 25 may enter the bore of seat member 84 which is in communication with the end of chamber 14. The opposite end of chamber 14 is provided with a similar seat member 88 having a peripheral groove 89 communicating with passage 23 and radial ports 91 through which the cold water may enter the bore of the seat member. This seat member is not threaded into the casing as is the seat member 84 but is provided with an annular flange 92 sitting upon a shoulder 93 formed in the casing and held against displacement by the cap 39. Both of the seat members 84 and 88 are therefore removable from the chamber 14 from the forward end thereof after access to the chamber has been attained by removal of the cap 39.

From Figs. 4 and 7, it will be apparent that seat members 84 and 88 are hollow and that a slide valve 26 is operable in member 88 to regulate the size of the port 91, and a similar valve 27 is operable within the member 84 to regulate the size of the port 87. The valve 26 is connected by a stem 94 with the piston 28, and similarly, valve 27 is connected with said piston by a stem 95. The relative pressures of the hot and cold water entering the regulating chamber 14 are automatically regulated in the following manner.

Assuming that the pressure of the cold water supply entering chamber 14 through port 91 drops below the pressure of the hot water entering said chamber through port 87. Such drop may be occasioned by the opening of the cold water faucets in the cold water supply line or by other circumstances. The greater pressure of the hot water upon the right hand face viewing Fig. 4 of the piston 28 will move this piston to the left viewing Fig. 4, thereby causing valve 27 to partially close port 87 and correspondingly diminish the inflow of hot water and consequently reducing the hot water pressure in the chamber. So long as the pressures of the hot and cold water on opposite faces of the piston 28 remain the same no further adjustment or movement will take place, but should either pressure rise or fall a movement of piston 28 corresponding to the pressure differential will take place to reestablish equal pressures of both hot and cold water within the chamber. When, therefore, the hot and cold water are delivered from this chamber to the mixing chamber, they are delivered at the same pressure, thus overcoming any tendencies for variations in the temperature of the resultant mixture which has heretofore resulted from differences in the pressures of the incoming hot and cold water supplies.

From the pressure-equalizing chamber, the cold water is delivered to the mixing chamber through the passage 29, and the hot water is delivered to said chamber through the passage 33.

A mixing valve located in the reduced lower portion of chamber 15 comprises a valve sleeve 96 snugly fitted into the chamber and provided with slotted ports 97 and 98 extending therethrough. A reciprocatory, tubular valve member 35 is disposed within the sleeve 96 and is provided with ports 101 and 102 adapted to register with the ports 97 and 98, respectively. The inner end of valve 35 is engaged by a spiral expansion spring 103 interposed between the valve and the end of the chamber, and the outer end of the valve is provided with a yoke 104 having a transverse top 105 threaded onto the nipple 106 of the thermostatic element and locked in position by a lock nut 107.

The thermostatic element, designated generally 36, is of the expansible bellows type which is filled with an expansible liquid whereby the bellows are expanded upon rise of temperature. The liquid is inserted into the bellows through a sealable nipple end 109. The outer end of the bellows is guided by a tubular guide member 111 loosely fitting the walls of the chamber 15, the member being clamped to the top wall of the thermostatic element by a bearing nut 112. This nut abuts at its outer end against the cam 47 mounted on the stem 44, as previously described.

Assuming that the parts are in the intermediate position of adjustment illustrated in Figs. 2 and 4, the ports 97 and 98 will each be about one-half open so that substantially equal quantities of hot and cold water will enter the mixing chamber inside the valve 35 from whence it will be delivered around the thermostatic element 36 to the outlet passage 37 connected with the delivery outlet 18 and through the transverse passage 38 with the delivery outlet 19. If the temperature of the resultant mixture is higher than that for which the thermostat is set, the thermostat will expand to thereby move valve member 35 outwardly or to the right viewing Fig. 4, thereby further opening port 97 and further closing port 98. Variations in temperature of the mixture will be automatically compensated for in this manner so that the resultant mixture will always be delivered at the desired temperature for which the valve is set. Should a colder mixture be desired, the adjusting handle 51 will be moved to engage a higher portion of cam 47 with nut 112, thereby moving the thermostat 36 and the valve 35 slightly to the right to increase the cold water flow and decrease the hot water flow into the mixing chamber. Similarly, adjustment of the handle 51 in the opposite direction will increase the hot water flow and correspondingly diminish the cold water flow to increase the temperature of the resultant mixture.

The outer end of the thermostatic element 36 is guided in its movements by the guide 111, and its inner end is guided by the valve member 35 to which it is rigidly attached. The spring 103 exerts a constant pressure against the thermostatic element through the intermediary of the valve member 35, and this valve member will be moved to the left by the spring, viewing Fig. 4, whenever adjustment of cam 47 permits a bodily movement of the thermostat to the left or when the thermostat contracts longitudinally as the result of a lowering of the temperature of the mixture.

It will be observed that the hot and cold water entering through ports 97 and 98 become mixed in the bore of valve member 35 before they enter the control chamber 15 in which the thermostat is located. This premixing of the water before it is brought in contact with the thermostat relieves the thermostat of the excessive strains to which it would be subjected if the hot and cold water were both discharged directly against it, as has been the case of valves of this character heretofore employed. The protection of the thermostat against subjection of excessive temperature ranges and fluctuations adds materially to the life of the thermostat.

Another advantageous feature of this mixing arrangement is that in case the thermostat should break or for any reason become inoperative, the valve 35 will immediately move to the left in Fig. 4 by spring 103 so as to completely close the ports 97 and 98 and thereby obviate any possibility of delivery of scalding water. Further protection against the delivery of excessively hot water in the event of failure of the cold water supply is afforded by the pressure-equalizing device which, as previously explained, will shut off the hot water supply upon failure of the cold water supply.

It should be apparent from the foregoing that our invention embodies a number of features desirable in a mixing valve of the character described. For instance, the various working parts of the valve are all accessible from the front end of the casing for repair and replacement purposes when the cap 39 is removed. The hot water may be shut off at the valve by turning spindle 66 with a screw driver, which closes valve 65, and likewise the cold water may be shut off by turning spindle 72 which closes valve 71. The pressures of the hot and cold water are equalized in the equalizing chamber, thereby obviating temperature fluctuations in the mixture delivered by the valve resulting from variations in pressure between the hot and cold water supplies. The hot and cold water under equal pressures are thoroughly intermixed before coming in contact with the thermostat, thereby protecting the thermostat against the injury resulting from subjection to extreme ranges of temperature, and the water is automatically shut off in case of failure of the thermostat. Furthermore, back flow of both hot and cold water from one line to the other in the event of differences in pressure in the supply lines is precluded by check valves 22 and 24. The screens 21 and 23 effectually screen both the incoming hot and cold water, and these screens are readily removable for cleaning or replacement purposes by simply unscrewing the closure plugs 57 and 58.

While we have shown and described that embodiment of our invention which at present seems preferable, it should be understood that the structural details herein disclosed are illustrative merely of the principles of our invention and may be varied within considerable limits without exceeding the scope of the invention as defined in the following claims.

We claim:

1. A mixing valve comprising, in combination, a casing defining a mixing chamber and two separate inlet chambers for hot and cold water respectively, valve means in said mixing chamber for regulating the relative proportions of hot and cold water admitted thereto, each of said inlet chambers having an inlet and an outlet, a strainer screen removably positioned in each of said inlet chambers, each of the latter chambers having an opening therein for the removal of its screen, a removable closure for each of said last named openings, and means for cutting off any flow of water to said inlet chambers in the event it is necessary to remove said closure members to gain access to said screens, said means including a manually operable shut-off valve at the inlet end of each chamber having a stem extending through the removable closure for such chamber into position for manipulation from outside such chamber and a check valve at the delivery end of each chamber.

2. A mixing valve comprising, in combination, a casing defining four cylindrical chambers disposed parallel to each other in generally pyramidal form with three chambers in a bottom row and a single chamber at the pyramid apex, all of said chambers being open at their forward ends and closed at their rear ends, the two outer chambers in said bottom row being arranged to form hot and cold water inlet chambers, separate removable closures for the open ends of said inlet chambers, a pressure equalizing valve in said chamber at the apex of said pyramid group, said casing being fashioned to form passages extending upwardly from the upper portions of said inlet chambers substantially tangentially of said pressure equalizing valve chamber and opening into the opposite sides of the latter, said passages being open at their upper ends, removable closures for said open passage ends, check valves in said passages accessible from said open upper ends of said passages upon removal of said last named closures, mixing valve means in the central chamber of said bottom row, said casing forming a passage communicating from said pressure equalizing valve chamber to said mixing valve chamber, and a common removable member for closing the outer ends of said two last named chambers to afford access to the valve means therein.

3. A mixing valve comprising, in combination, a casing defining four cylindrical chambers disposed parallel to each other in generally pyramidal form with three chambers in a bottom row and a single chamber at the apex, all of said chambers being open at their forward ends and closed at their rear ends, the two outer chambers in said bottom row being arranged to form hot and cold water inlet chambers, a pressure equalizing valve in the chamber at the apex of the pyramid group, said casing being fashioned to form passages extending upwardly from the upper front portions of said inlet chambers and substantially tangentially of said pressure equalizing valve chamber and opening into the opposite sides of the latter, said passages being open at their upper ends, closures for said open passage ends, check valves in said passages accessible from said open upper ends of said passages upon removal of said closures, mixing valve means in the central chamber in said bottom row, said casing forming a passage communicating from said pressure equalizing valve chamber to said mixing valve chamber, removable closure means for the open front ends of all of said chambers, inlet connections for said inlet chambers arranged at the rear portions thereof, and an outlet connection for said mixing valve chamber arranged at the rear portion thereof.

4. A mixing valve comprising a casing providing a pressure equalizing chamber, a mixing chamber and a thermostat chamber, said pressure equalizing chamber being of cylindrical construction and provided at one end with a removable closure, removable hollow seat members positioned in said chamber near the ends thereof and provided with radial ports permitting fluid flow radially into the chamber and thence longitudinally of the chamber, a valve slidable in each seat member for regulating said respective ports, a piston in the cylinder between the seat members, connections between said piston and said valves, the seat members and said piston and valves being removable from the cylinder upon removal of said closure.

5. A mixing valve comprising a casing providing a cylindrical pressure equalizing chamber, a mixing chamber and a thermostat chamber, valve seat members removably positioned in said equalizing chamber near the ends thereof, valves cooperating with the respective seat members to control the fluid flow therethrough, a centrally located piston, connections between said piston and said valves, a slide valve in said mixing chamber, a thermostat in said thermostat chamber connected with said slide valve to actuate the same, a spring acting on said slide valve in opposition to the action of the thermostat to shut off both the hot and cold water flows to the mixing chamber upon a predetermined contraction of the thermostat, and means for adjusting the position of the thermostat bodily in and longitudinally of the thermostat chamber.

6. A mixing valve comprising a casing providing a plurality of longitudinally extending bores each connected with a source of water supply, a screen and a shut-off valve disposed in each of said bores and removable from one end of the casing, closures for the openings through which said valves and screens are removable, transverse passages extending from said bores, a pressure equalizing chamber intermediate said passages, means connecting one of said passages with one end of said mixing chamber and the other of said passages with the other end of the mixing chamber, valve seat members removably mounted in the end portions of said mixing chamber, and through which liquid flow from said passages is delivered into the chamber, control valves reciprocable within said seat members to control the flow of water therethrough, a piston interposed between the seat members and connected with said valves whereby said valves are controlled, a cylindrical mixing chamber provided with ports communicating respectively with the pressure equalizing chamber at opposite sides of said piston, a slide valve in said mixing chamber for controlling the hot and cold water flows into the mixing chamber through said ports, a thermostat connected with said slide valve, a thermostat chamber enclosing the thermostat and communicating with the mixing chamber, said thermostat being slidably mounted within said chamber, a spring acting on said slide valve in opposition to the thermostat, and means for adjusting the position of the thermostat in said chamber.

7. A mixing valve comprising, a casing defining four cylindrical chambers arranged in parallelism, two of said chambers constituting hot and cold water inlet chambers being provided at one end with individually removable closures, a shut-off valve in each chamber provided with a stem projecting through such removable closure for manipulation from outside the chamber, another of said chambers constituting a pressure equalizing chamber and being provided with a removable closure, removable valve seats positioned in said pressure equalizing chamber near the ends thereof, a pressure actuated piston located in the chamber intermediate the ends thereof, valves connected to said piston and arranged to cooperate with said seats to regulate the amounts of hot and cold water delivered to said chamber from said hot and cold inlet chambers, the fourth of said chambers constituting a mixing chamber, means for conducting hot and cold water from said pressure equalizing chamber to said mixing chamber, a slide valve for regulating the amounts of hot and cold water delivered, a thermostat in said mixing chamber connected with said slide valve whereby the slide valve is actuated, and manually regulatable means for adjusting the position of said thermostat to thereby regulate the temperature of the water mixture delivered from the casing.

ALBERT J. RUEGG.
GLEN MARTIN.